United States Patent [19]

Berry et al.

[11] Patent Number: 4,494,588
[45] Date of Patent: Jan. 22, 1985

[54] VENEER LATHE

[75] Inventors: Larry R. Berry; Anton S. Richert, both of Roseburg, Oreg.

[73] Assignee: Sun Studs, Inc., Roseburg, Oreg.

[21] Appl. No.: 487,584

[22] Filed: Apr. 22, 1983

[51] Int. Cl.³ .................................................. B27L 5/04
[52] U.S. Cl. ................................ 144/209 R; 144/213; 144/211; 144/214; 144/356; 364/474
[58] Field of Search ....... 144/209 R, 209 A, 211–215, 144/365; 82/46–48; 318/640, 653, 571, 567, 565; 364/474

[56] References Cited

U.S. PATENT DOCUMENTS

| 1,877,013 | 6/1929 | Moore | 144/209 R |
|---|---|---|---|
| 3,244,206 | 3/1963 | Bossen | 144/209 R |
| 3,421,560 | 1/1969 | Springate | 144/209 R |
| 3,898,555 | 8/1975 | Tellerman | 324/208 |
| 4,224,515 | 9/1980 | Terrell | 318/640 |
| 4,378,827 | 4/1983 | Shrum et al. | 144/209 R |
| 4,378,829 | 4/1983 | Sohn | 144/357 |
| 4,379,476 | 4/1983 | Berry | 144/357 |
| 4,379,477 | 4/1983 | Shrum | 144/357 |
| 4,384,601 | 5/1983 | Richert | 144/209 A |

OTHER PUBLICATIONS

Plywood Mill Process Control System, 104–144, published by Unico, Date Unknown.

Primary Examiner—W. D. Bray
Assistant Examiner—Jorji M. Griffin
Attorney, Agent, or Firm—Chernoff, Vilhauer, McClung, Birdwell & Stenzel

[57] ABSTRACT

A lathe for cutting a spiral strip of veneer from the surface of a log includes motor-driven mechanisms for adjusting the knife blade pitch angle and edge height, and for moving a pressure head relative to the knife to adjust the vertical gap and horizontal gap between the knife edge and the roller bar, and provides sensors for determining the actual positions of movable elements of the lathe, thus enabling computer-controlled adjustment of the movable elements of the lathe during lathe operation. A knife clamp of the lathe includes a plurality of separate clamp segments for pressing against different portions of a knife bar to hold it firmly, resisting deformation and rocking of the knife bar. Fluid-pressure-biased bearings eliminate looseness between relatively movable parts of the lathe, reducing the amount of variation of thickness in veneer produced using the lathe. Veneer thickness is controlled by monitoring cumulative movement of the lathe spindles and the main feed carriage.

4 Claims, 15 Drawing Figures

FIG. 11
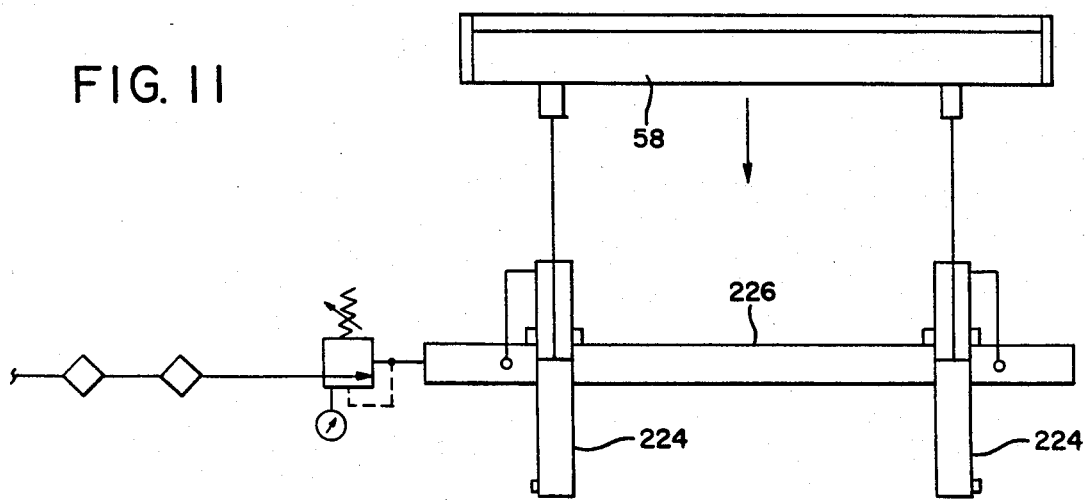
FIG. 13
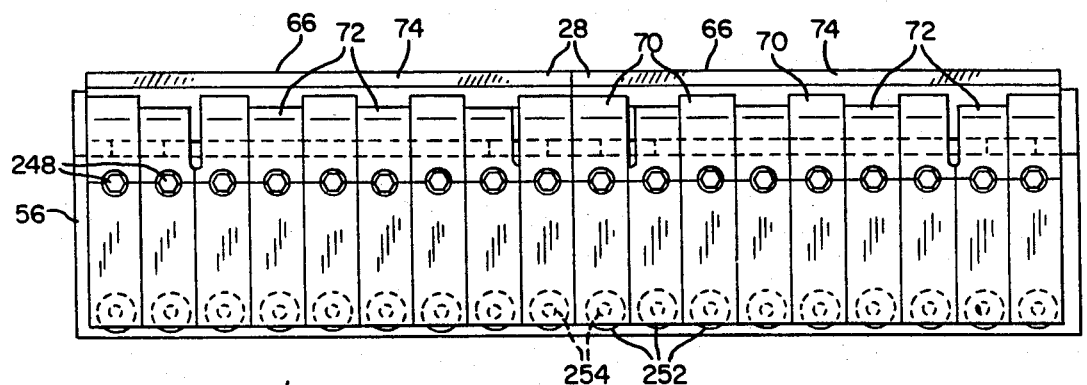
FIG. 14
FIG. 15
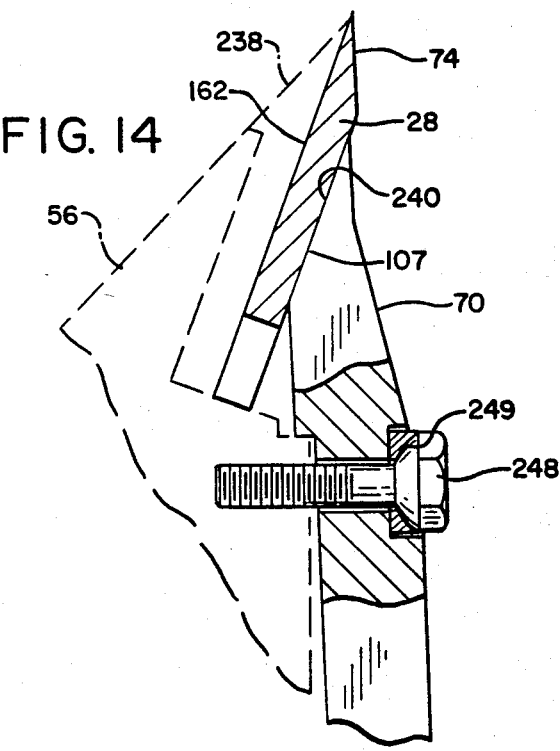

VENEER LATHE

TECHNICAL FIELD

The present invention relates to improvements in veneer lathes, and more specifically to improvements in adjustment of movable elements of lathes used to produce veneer for use in the manufacture of plywood.

BACKGROUND OF THE INVENTION

Efficient and economical production of plywood demands consistent production of veneer of consistently high quality. Economical veneer production demands the reliable ability of a veneer lathe to cut the greatest possible amount of high quality veneer from each block. Every additional spiral layer or wrap of veneer which can be cut from a given block adds a significant increase to the amount of veneer produced. Such an increase is even more significant in relation to the total size of a block whose initial diameter is small.

The most desirable veneer for use in manufacturing plywood is of a uniform thickness, is free from splits which extend entirely through the thickness of the veneer, and knots in the wood are held securely in place by the surrounding grain. The ability to produce veneer of high quality from each log or block of wood depends to a great degree on maintenance of spatial relationships between several different relatively movable parts of a veneer lathe, and the ability to control these relationships closely in a very dynamic environment where great forces are encountered.

The block from which veneer is "peeled" reacts differently at different times during the process of cutting the veneer. Several factors which apparently affect the resulting veneer quality vary or are likely to vary as the block diameter is reduced during peeling or among different blocks. Among these factors are:

(1) the radius at which the veneer is being cut from the block;

(2) the species of wood of which the veneer is being cut;

(3) the structure of the grain of the particular block, that is, whether the wood has many or few knots, or tight or open grain (depending on whether the growth of the particular part of the tree was fast or slow, often differing between north and south sides of a tree);

(4) the moisture content of the block, which is preferably high at the time veneer is cut from a block;

(5) the temperature of the block, preferably in the range of 150°–165° F.;

(6) the beam strength of the block, that is, its resistance to bending between the spindles of a lathe in response to gravity or the pressure of the veneer knife; and (7) the position of the block relative to the assumed position of the spindles of the lathe (the spindles may sag or the block may shift downward relative to the spindles because of its own weight when the block is large, or the block may rise in reaction against the upward support provided by the veneer knife and the driving force of the spindles when removal of wood has reduced the weight of the block.

The veneer produced by veneer lathes embodying the previously available technology has been undesirably inconsistent in thickness, primarily as a result of a lack of ability to hold the veneer knife securely and accurately enough in the optimum position and the inability to coordinate the rate of movement of the veneer knife toward the axis of rotation of the block accurately enough with respect to the rate of spindle rotation speed while cutting veneer from the block.

The veneer knife edge height and veneer knife blade pitch angle in the past have often been established as compromises, and have been difficult to maintain accurately during lathe operation. This has resulted in unnecessary failure to achieve the highest economy in production of veneer from each block, as block spinouts occur more frequently when knife height and pitch are improper.

Because it has not been possible to produce veneer whose thickness is consistent enough, it has been necessary to cut veneer somewhat thicker than the preferred thickness in order to ensure that there is sufficient total thickness of veneer to produce plywood whose thickness is within specification. Additionally, the uneven thickness of veneer has required the use of pressure on the plywood as high as 250–450 lb/in$^2$ in clamping the layers of veneer and glue together to assure tight bonds in the plywood. As a result of such higher clamping pressure the veneer is actually compressed during the process of lamination. Uneven thickness of veneer thus results in a substantial loss of veneer thickness by crushing, a need to sand away considerable amounts of wood to reduce the finished plywood to specified thickness, or both of the above. It is desirable, then, to produce veneer of a more consistent thickness so that the maximum thickness may be reduced without production of veneer thinner than the minimum required.

It is therefore an important objective of the present invention to provide an improved veneer lathe which is capable of production of increased quantities of veneer of consistent thickness and quality from each block.

It is another important objective of the present invention to provide a veneer lathe capable of producing veneer of more accurately controllable thickness than has previously been possible.

It is an important feature of the veneer lathe of the present invention that it includes sensors for directly determining and indicating remotely the positions of various adjustable elements of the veneer lathe, so that the positions of those moveable elements can be adjusted during the operation of the veneer lathe.

It is another important feature of the present invention that it utilizes frequently revised measurement of the amount of travel of the main feed carriage and of the amount of rotation of the spindles to correct the speed at which the main feed carriage is advanced toward the block while peeling veneer.

It is an important advantage of the present invention that it provides a veneer lathe which produces veneer of a more consistent thickness than was possible previously.

It is another important advantage of the present invention that it provides a veneer lathe in which veneer knife movement speed errors are kept from accumulating as veneer thickness errors.

The foregoing and other objectives, features and advantages of the present invention will be more readily understood upon consideration of the following detailed description of the invention taken in conjunction with the accompanying drawings.

BRIEF DESCRIPTION OF THE DRAWING

FIG. 11 is a simplified, schematic view of a pneumatic snubber system for controlling the position of a pressure head in the veneer lathe shown in FIG. 1.

FIG. 13 is a front elevational view of the knife clamp arrangement of the veneer lathe shown in FIG. 1.

FIG. 14 is side elevational view of one of the clamp segments of the knife clamp shown in FIG. 13.

FIG. 15 is a side elevational view of another one of the clamp segments of the knife clamp shown in FIG. 13.

DETAILED DESCRIPTION OF THE PREFERRED EMBODIMENT

Figure 1:
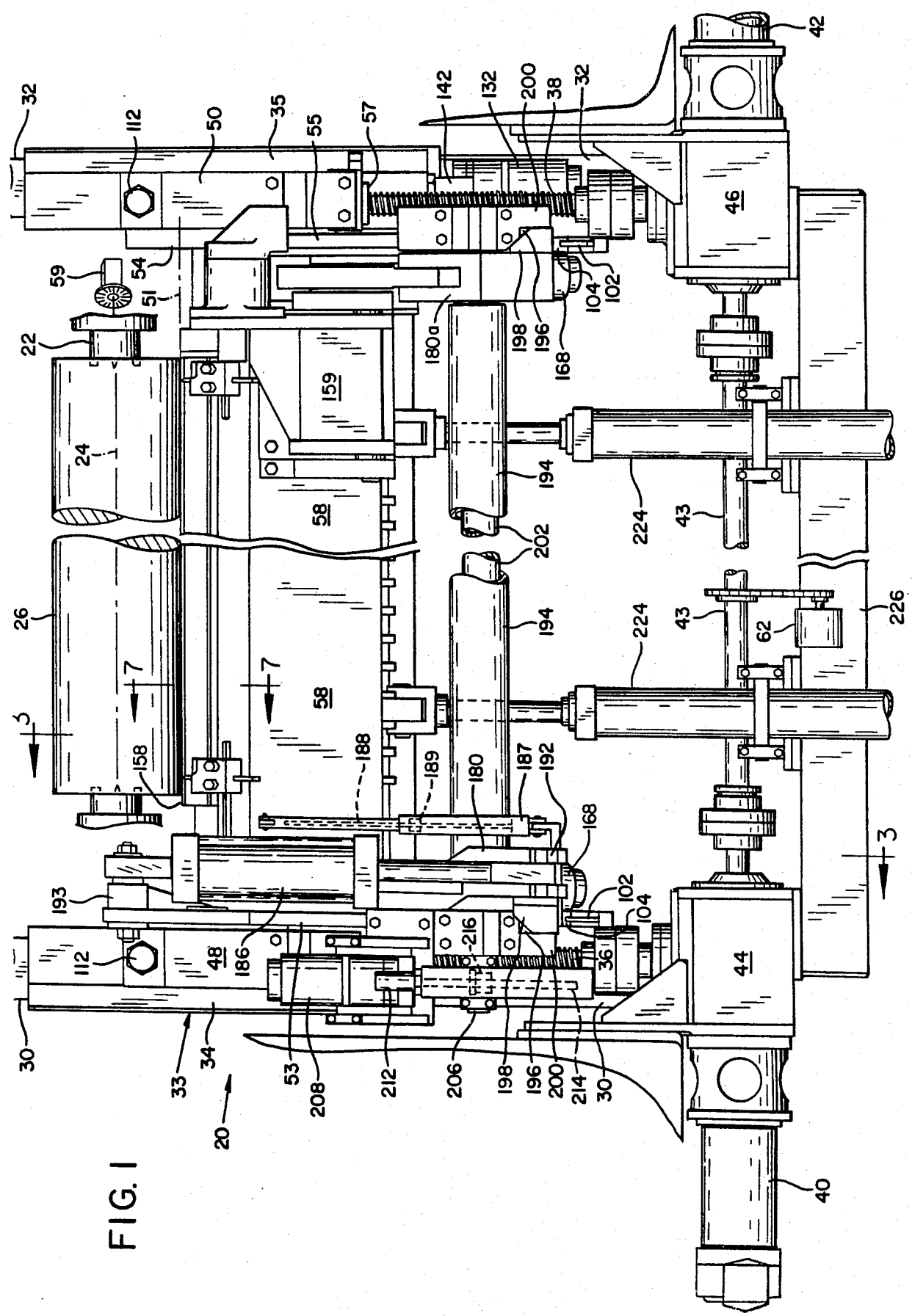
FIG. 1 is a partially cut away top plan view of a veneer lathe which is a preferred embodiment of the present invention.
Figure 2:
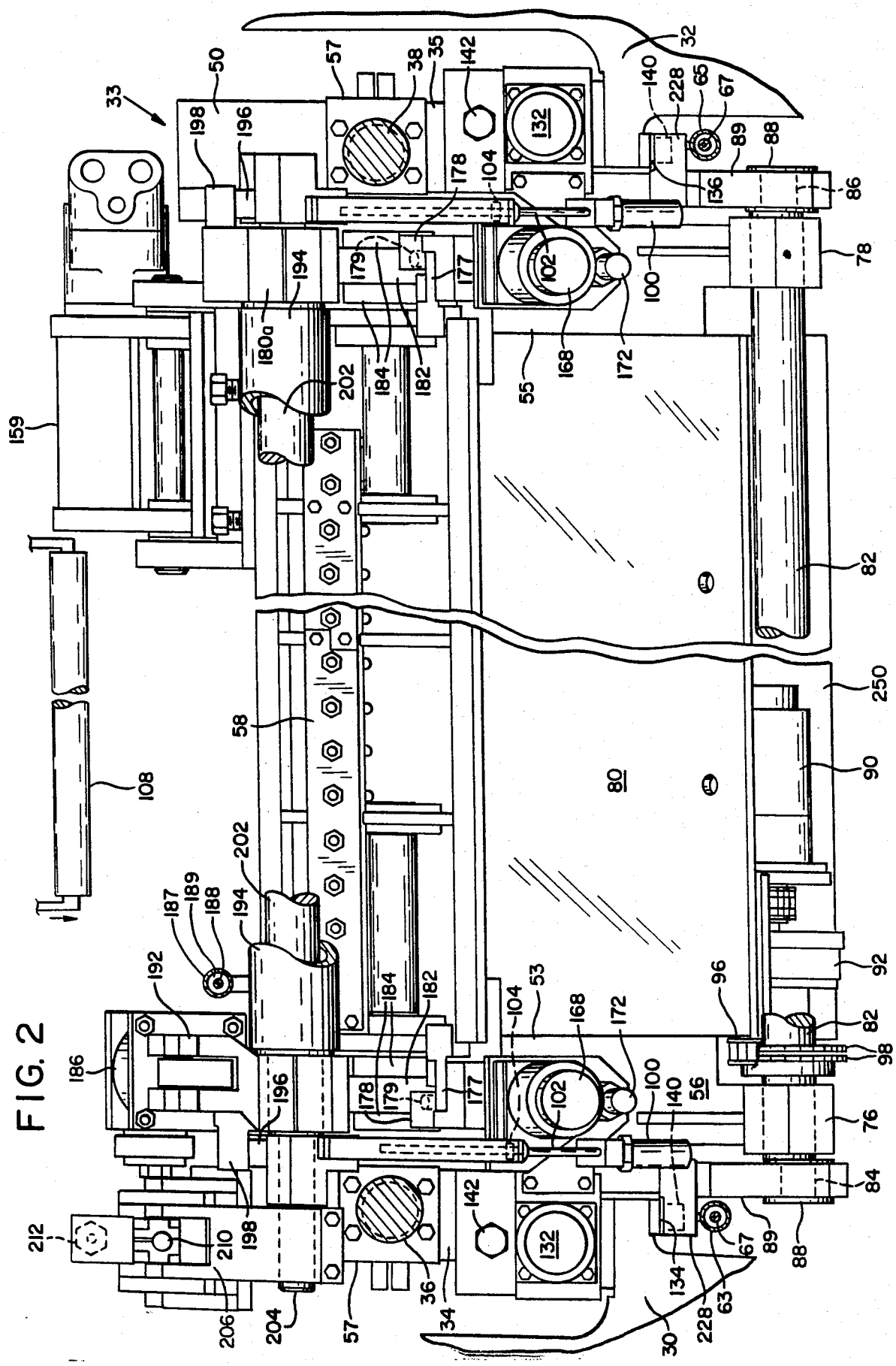
FIG. 2 is a partially cut away rear elevational view of the veneer lathe shown in FIG. 1.

Referring now first to FIGS. 1-5 of the drawings, a veneer lathe 20 comprises a pair of rotatable spindles 22 supported coaxially to establish a horizontal spindle axis 24. The spindles are driven to rotate about the spindle axis 24 while gripping a block of wood such as the block 26 to permit a ribbon of veneer to be cut or "peeled" from the block 26 by a knife 28.

A pair of machined flat ways 30 and 32 are located fixedly with respect to the spindle axis 24, extending perpendicularly away from the spindle axis 24, parallel with one another, in a horizontal plane located below the height of the spindle axis 24. A main feed carriage 33 comprising a pair of upstanding end members 34 and 35 is supported movably on the ways 30 and 32 for movement therealong either toward or away from the spindle axis 24.

The main feed carriage 33 is moved by a pair of ball screws 36 and 38 driven by main feed servo motors 40 and 42, interconnected through a cross shaft 43 and gear boxes 44 and 46 which are fixedly located with respect to the ways 30 and 32 and the spindles 22. The main feed carriage end members 34 and 35 include a pair of arcuate trunnion supports 48 and 50 which define a knife pitch angle axis 51 passing through their centers. The trunnion supports 48 and 50 carry the respective left and right trunnions 52 and 54 which extend from respective left and right end portions 53 and 55 of an elongate knife carrier 56, which holds the veneer knife 28. The trunnions 52 and 54 permit the knife carrier 56 to be rotated about the knife pitch angle axis 51 to adjust the knife pitch angle, as will be described in greater detail below.

The height of each trunnion support 48 and 50 with respect to the ways 30 and 32 is adjustable as will also be explained more fully below, so that the position of the veneer knife 28 is controllable to establish an optimum relationship between the location of the veneer knife 28 and the block 26.

The main feed ball screws 36 and 38 are driven at a speed coordinated with the rotation of the spindles 22. Each ball screw acts against a ball nut 57 located in the respective end member 34 or 35 to move the main feed carriage 33, carrying the veneer knife 28 toward the spindle axis 24 the distance required during each rotation of the block 26 to produce the desired thickness of the veneer.

A pressure head 58 helps to steady the block 26 relative to the position of the knife 28 in order to assist in production of veneer of uniform thickness. The pressure head 58 is supported on the knife carrier 56 and is controllably movable with respect to the veneer knife 28 between a normal position, a retracted position, or intermediate positions, as desired. It occupies the normal position, close to the knife 28, during the peeling of veneer from the block 26. An intermediate or fully retracted position, providing substantially greater clearance for making deeper cuts in the block 26, is used while uneven outer portions of a log are cut away during roundup of a block 26. The pressure head 58 extends longitudinally along the length of the knife 28, in its normal position, and each end thereof is supported movably with respect to the knife carrier 56. The position of the pressure head 58 with respect to the knife 28 also is controllable in small increments during lathe operation, as will be more fully explained subsequently.

The knife 28 defines a knife edge 66 which must be sharpened periodically in order to produce veneer of acceptable quality. For easier handling the knife 28 may be made up of two or more quickly replaceable sections, ordinarily fitted end to end and held firmly in place on the knife carrier 56 by a knife clamp assembly 68. The knife clamp assembly 68 includes a plurality of individual clamp segments 70 and 72 which function, as will be explained more fully below, to hold the knife 28 securely and resist vibration or unintended movement which could otherwise cause variations in the thickness of veneer being cut. Nevertheless, the knife clamp assembly 68 permits rapid replacement of a knife 28 with another one, on which the edge 66 has been restored by accurate grinding to provide a ground surface 74 oriented at a predetermined angle to the plane of the knife 28.

Main Feed Carriage Movement

Figure 6:
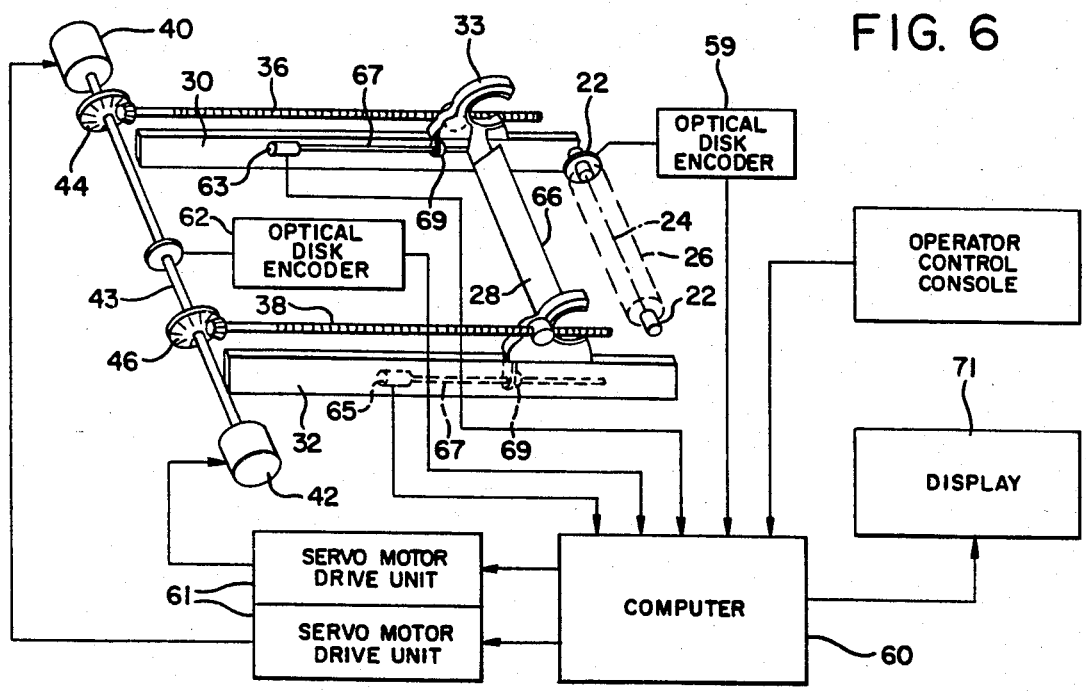
FIG. 6 is a simplified, partially schematic view showing the manner of controlling the position of the main feed carriage of the veneer lathe shown in FIG. 1.

The main feed carriage 33, as explained briefly in the preceding section, is driven toward or away from the spindle axis 24 of the veneer lathe 20 in order to move the knife 28 at a controlled rate, toward the center of the block 26 from which veneer is being peeled. Referring now additionally to FIG. 6, as the spindles 22 are rotated, an optical disc encoder 59 driven by the spindles 22 generates a series of electrical pulses precisely indicating each small increment of the rotation of the spindles 22. These pulses are provided electrically to an electronic computer 60 which determines the cumulative angular amount of rotation of the spindles as each block 26 is peeled. For example, the disc encoder 59 may provide 9,600 pulses per revolution of the spindles 22. The required distance of advance of the main feed carriage 33 per revolution of the spindles 22, which establishes the thickness of veneer produced, is entered into the computer 60 by the operator. In response to this information the computer 60 produces a main feed motor drive control signal which is transmitted to the main feed servo motor drive units 62 to be used to control the speed of the main feed motors 40 and 42.

To obtain feedback information useful in controlling the speed of the main feed drive motors 40 and 42, position sensors 63 and 65 measure and indicate the respective actual position of each of the upstanding end members 34 and 35 of the main feed carriage 33, providing their position indications in the form of electrical signals to the computer 60.

Each of the position sensors 63 and 65 may be of the type described in Tellerman U.S. Pat. No. 3,898,555, the disclosure of which is hereby incorporated herein by reference. Each sensor 63 and 65 includes a sensor waveguide tube 67 fixedly connected with the respective way 30 or 32 and a moveable main feed carriage position indicating magnet 69 connected with the respective end member 34 or 35 and moved along the sensor tube by movement of the main feed carriage 33 along the ways 30 and 32.

The sensors 63 and 65 each frequently (normally once every 5 milliseconds) provide an electrical output pulse whose duration is representative of the position of the position indicating magnet 69. The duration of the pulse is measured in the computer 60 by counting pulses from a 10 MHz oscillator during each position sensor pulse.

The position indications from the two main feed position sensors 63 and 65 are used by the computer 60 to observe the distance the main feed carriage 33 advances toward the block 26 and to determine whether the main feed carriage 33 is moving in proper coordination with the rotation of the spindles 22 by observing the amount of spindle rotation and main feed carriage movement beginning when the lathe operator initiates normal veneer peeling operation on each block 26 by entering an appropriate order into the computer 60. If the rate of advance is incorrect the computer 60 adjusts the speed of the main feed servo motors 40 and 42 by appropriate change of the drive signals to the main feed servo motor drive units 61, so that the actual cumulative amount of advance of the knife 28, and thus the thickness of veneer cut from the block 26 is controlled directly to correspond properly with the cumulative angular movement of the spindles 22 as each block 26 is peeled.

The position sensors 63 and 65, and similarly the other position sensors which will be described in connection with the present invention, provide an indication to the computer 60 in a form perceivable by the copmputer 60, and the words "indicate" and "indication" are therefore to be accorded a broad interpretation where used in this description with reference to all such position sensors. The indication of the position of the main feed carriage 33 may also be provided to a display unit 71, for example, a CRT display monitor.

The computer 60 also compares the positions of the two separate end members 34 and 35. Unequal motion of the two end members 34 and 35 would result in variations in thickness of the veneer produced by the lathe 20, and extremely large differences of the movement of the two end members 34 and 35 could result in damage to the lathe itself. For those reasons, the computer 60 compares the positions of the end members 34 and 35, and stops the main feed motors 40 and 42 if the difference in the location of the end members 34 and 35 becomes too great. For example, the computer 60 may be programmed to order the main feed motors 40 and 42 to stop if the end member 34 advances more than 0.003 inch further toward the spindle axis 24 than the end member 35.

Another optical disc encoder 62, driven by the cross shaft 43, also provides a signal to the computer 60 as an indication of the actual speed at which the cross shaft 43 is rotating. This information is useful in calibrating the carriage feed drive system.

Veneer Knife Pitch Angle Control

Figure 7:
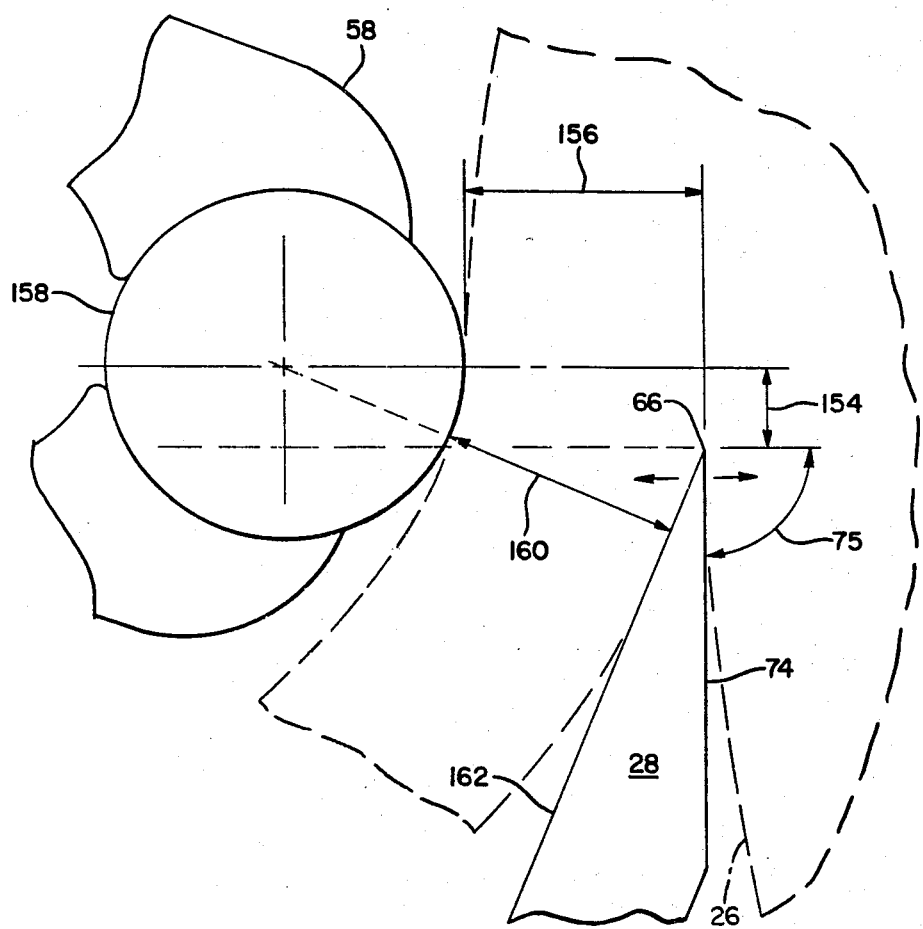
FIG. 7 is a diagrammatic view at an enlarged scale, showing the relationship between the edge of a veneer knife and a roller bar of a pressure head portion of a veneer lathe such as the one shown in FIG. 1, taken in the direction indicated by line 7—7.

Veneer is cut by the lathe 20 in a dynamic environment, with the spindles 22 and the block 26 rotating at an angular speed providing surface speeds of up to several hundred feet per minute. It is desirable for economical veneer production to have the knife 28 oriented at the optimum position for cutting a layer of veneer from the block 26 at all times during this operation. As shown in FIG. 7, the ground surface 74 of the veneer knife 28, which faces toward the block being peeled, and a plane generated by the edge 66 as the main feed carriage 33 moves along the ways 30 and 32, define the knife pitch angle 75.

It has been found that the best results are obtained when the pitch angle 75 is varied during the process of peeling a block. The empirically determined optimum pitch angle 75 is larger during cutting of veneer from the outer part of a block 26 where its diameter is larger, but the optimum pitch angle decreases with the decrease in diameter of the block 26. It appears that the desirability of such variation in pitch angle 75 may be related to vertical movement of the block 26 with respect to the spindles 22, or movement of the spindles 22 relative to their supporting bearings. This seems to result in the actual position of the center of the block 26 being somewhat lower than the spindle axis 24 when the block 26 is large. The block 26 appears to rise relative to the spindle axis 24 by several thousandths of an inch as its size is reduced, probably as a result of reaction against the upward force of the knife 28 against the block 26, combined with the forces exerted by the spindle 22. Decreasing the pitch angle 75 gradually as the block 26 reaches a smaller size maintains tangency between the ground surface 74 and the exterior surface of the block 26, as the block 26 moves upward relative to the spindle axis 24, although it is necessary to avoid too much heel pressure against the block, since a spinout could result.

In the veneer lathe 20 of the present invention, control of the pitch angle 75 is accomplished by tilting the knife carrier 56, rotating its trunnions 52 and 54 relative to the trunnion supports 48 and 50 of the main feed carriage 33. The end portions 53 and 55 of the knife carrier 56 include pitch angle lever arms 76 and 78, each extending rearwardly and downwardly away from the pitch angle axis 51. The lever arms 76 and 78 are used to rotate the trunnions 52 and 54 in the trunnion supports 48 and 50 and thus to vary the degree of knife pitch with respect to the main feed carriage 33.

An apron 80, part of the knife carrier 56, extends slopingly rearwardly and downwardly away from the vicinity of the edge 66 of the knife 28 as a support for veneer as it is peeled from the block 26 and to provide a stiff, substantial support for the knife 28. A pitch angle adjustment shaft 82, which extends parallel with the knife pitch angle axis 51, is supported by the pitch angle lever arms 76 and 78, below the apron 80.

The pitch angle adjustment shaft 82 includes a central portion which is held by and is rotatable with respect to the pitch angle lever arms 76 and 78. End portions 84 and 86 of the shaft 82 are eccentric with respect to the central portion and are offset equally in the same direction relative to the central portion of the shaft 82. The eccentric end portions 84 and 86 are rotatably journaled in respective reaction members 88 carried by downwardly depending portions 89 of the main feed carriage end members 34 and 35. Each of the reaction members 88 is slidable relative to the main feed carriage 34, in a direction parallel with the direction of movement of the main feed carriage 34 along the ways 30 and 32.

A pitch angle control motor 90, preferably an electric stepping motor controllably movable in small angular increments, drives a reduction gear assembly 92 which in turn drives a sprocket 94. An endless chain 96 connects the sprocket 94 to a sprocket 98 located on the pitch angle adjustment shaft 82, making it possible to rotate the pitch angle adjustment shaft 82 controllably through extremely small angular changes of position. In a preferred embodiment of the lathe 20 rotation of the pitch angle adjustment shaft 82 produces a maximum movement of the trunnions 52 and 54 in the trunnion supports 48 and 50 through an angle of no more than 5 degrees. This provides the ability to make extremely minute variations of the pitch angle 75 by relatively very large amounts of rotation of the pitch angle control motor 90.

In order to ascertain the actual knife pitch angle 75 directly, a pitch angle position sensor 100 is provided on each end member 34 and 35 of the main feed carriage 33 to detect the rotational position of the trunnions 52 and 54 of the knife carrier 56 with respect to the end members 34 and 35. The pitch angle position sensor 100 may, like the carriage position sensors 63 and 65, be of the type described in Tellerman U.S. Pat. No. 3,898,555, including a position sensor waveguide tube 102 mounted on the knife carrier 56 and position indicating magnets 104 fixedly mounted on the end members 34 and 35 of the main feed carriage 33.

Figure 8:
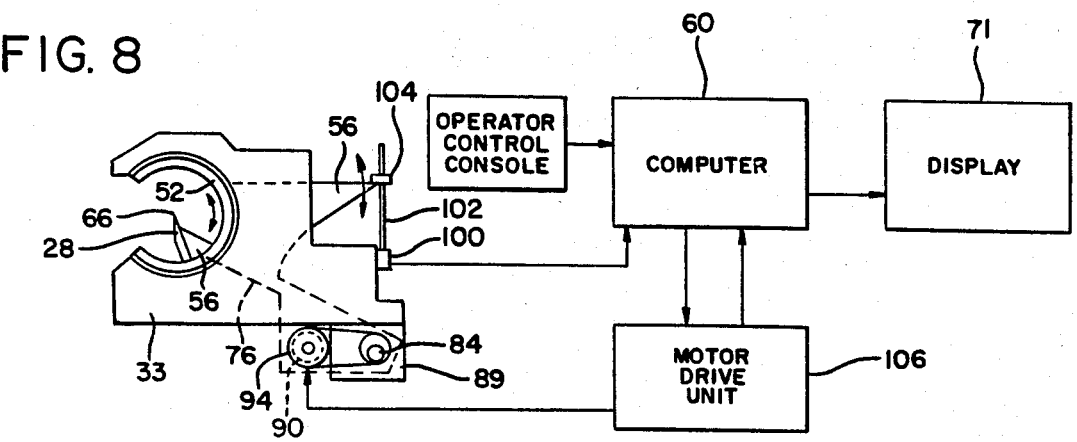
FIG. 8 is a simplified, partially schematic view illustrating the manner of adjusting and controlling the pitch angle of the knife of the veneer lathe shown in FIG. 1.
Figure 9:
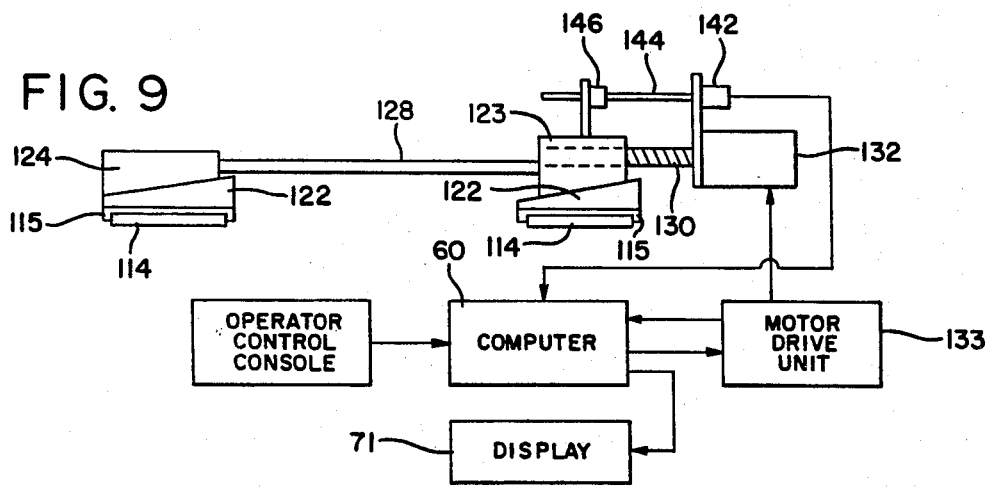
FIG. 9 is a simplified, partially schematic view showing the manner of controlling the veneer knife height in the veneer lathe shown in FIG. 1.

As FIG. 8 shows somewhat schematically, an electrical signal representative of the position of the magnet 104 relative to the position sensor tube 102 is provided by the pitch angle position sensors 100 to the computer 60. The computer 60 generates a pitch angle control motor drive order signal in response to either a program or orders entered into the computer 60 by a lathe operator, and transmits the drive order signal to the pitch angle motor drive unit 106. The motor drive unit 106 provides appropriate motor control signals to the pitch angle control motor 90, which drives the pitch angle adjustment shaft 82 in the appropriate direction to move the pitch angle lever arms 76 and 78 until the signal from the pitch angle position sensor 100 indicates to the computer 60 that the actual position of the lever arms 76 and 78 coincides with the required position determined by the computer 60. The actual pitch angle 75 sensed by the pitch angle sensors 100 may be shown on the display unit 71.

Preferably, signals from each of the position sensors 63 and 65, representative of the position of each of the end members 34 and 35 of the main feed carriage 33 along the ways 30 and 32 are also used by the computer 60 in controlling the knife pitch angle 75. Such signals are directly representative of the radius of the block 26 during cutting of veneer. The computer 60 is preferably programmed to establish the optimum pitch angle 75 at all times times by providing the appropriate pitch angle motor drive order signal to the motor drive unit 106 in response to the position of the main feed carriage 34 along the ways 30 and 32 during the course of cutting veneer from a block 26.

For example, such a program which has been found to produce optimum results in cutting veneer from a block 26 of fir wood using the lathe 20 provides a knife pitch angle 75 of 90 degrees for cutting at a block radius of 16 inches. The program changes the pitch angle linearly, moving the pitch angle lever arms 76 and 78 downward and the heel 107 of the knife 28 toward the block 26 as it is peeled, to provide a pitch angle 75 of 89.2 degrees when the radius of the block 26 has been reduced to 1.95 inches.

Other programs may be used to regulate the pitch angle as desired in accordance with experience, to provide the optimum results while cutting blocks of other varieties of wood, or in response to other differences among the variables which have been found to affect the efficient production of veneer of high quality. For example, a different program may be desired for the control of the knife pitch angle 75, depending upon whether or not a device such as a block stabilizer 108 (shown schematically in FIG. 4) is used. Such a block stabilizer 108 is preferably used in conjunction with the veneer lathe 20 to press against the cylindrical surface of a block 26 during peeling of veneer, in order to counter the effects of imbalance of the block 26, or pressure exerted by the edge 66 of the knife 28, which otherwise tends to cause the block to rise, bend, or move away from the knife 28. By adding to the stability of the block 26 while veneer is being peeled therefrom, such a block stabilizer 108 contributes to maintenance of uniform thickness of the veneer produced.

Knife Height Control

To provide consistent veneer quality the proper height of the edge 66 of the knife 28 relative to the spindle axis 24 must be established and maintained. Ordinarily, the knife edge 66 will be adjusted to a height level with that of the spindle axis 24, so that the edge 66 generates a plane including the spindle axis 24 as the main feed carriage 33 is moved along the ways 30 and 32.

Referring to FIGS. 2, 3, 4 and 9, it will be seen that each end member 34 or 35 of the main feed carriage 33 is supported atop the respective way 30 or 32 on slide pads 114 of friction resistant synthetic material attached to the end members held in contact with the top surface of the respective way 30 or 32 in retainers 116 at the front and rear ends of the respective end members 34 and 35.

A pair of lower wedges 122 are located one atop each retainer 115, one wedge 122 thus being situated at each end of the respective end member 34 or 35.

Both the retainers 115 and the lower wedges 122 are restrained against movement relative to the respective end member 34 or 35, in the direction of movement of the main feed carriage 34 along the ways 30 and 32, by removable keepers 127 and 129, but the retainers 115 and the lower wedges 122 are movable through a limited distance in a vertical direction relative to the respective end member 34, 35.

A pair of upper wedges, a rear upper wedge 123 and a forward upper wedge 124, are located atop the lower wedges 122, in weight-bearing contact against a horizontal bottom surface 125 and 126 of each of the end members 34 and 35. The upper wedges 123 and 124 are movable relative to both the bottom surfaces 125 and 126 and the lower wedges 122, in the direction of movement of the main feed carriage 33. The upper wedges 123 and 124 of each end member 34 and 35 are interconnected with one another by a pair of tie-rods 128 which synchronize movement of the upper wedges.

A knife height adjustment screw 130 extending parallel with the ways 30 and 32 is threadedly engaged with each rear upper wedge 123 and driven by a respective knife height adjustment stepping motor 132, to move the upper wedges 123 and 124 in response to a separate height adjustment signal provided by the computer 60 to a respective drive unit 133. Movement of the upper wedges 123 and 124 relative to the lower wedges 122 raises or lowers the respective end member 34 or 35, including the associated trunnion support 48 or 50, with respect to the upper surface of the way 30 or 32.

Adequate clearance is provided between a respective bottom surface 134 or 136 of the way 30 or 32 and a gib 228 of the respective end member 34 or 35, to permit a desired range of adjustability of the height of the trunnion supports 48 and 50, for example, 0.200 inches. Upward movement of the end members 34 and 35 is limited, however, by fluid-pressure-biased bearings 140 located, respectively, below the front and rear portions of each end member 34 or 35. The fluid-pressure-biased bearings 140 function, as will be explained more fully hereinafter, to prevent undesired upward movement or vibration of the main feed carriage 33 relative to the ways 30 and 32, in order to maintain the location of the veneer knife 28 as precisely as possible with respect to the block 26 from which veneer is being cut.

Adjustment of knife height 141 relative to the ways 30 and 32 for maintenance of uniform lathe performance is monitored by the use of a blade height sensor 142, associated with each end member 34 or 35. The blade height sensor 142 may be similar to the pitch angle position sensor 100 previously described, and includes a sensor waveguide tube 144 whose location is fixedly established with respect to the end piece 60 or 62, and a position indicating magnet 146 which is fixedly attached to the rear upper wedge for movement therewith along the sensor tube 142. Since the location of the upper wedges 123 and 124 with respect to the lower wedge 122 directly and positively establishes the height of the respective trunnion support 48 or 58 relative to the way 30 or 32, the blade height sensor 142 provides a direct indication of the blade height at each end member 34 and 35 of main feed carriage 33, permitting the optimum blade edge height 141 to be maintained.

Pressure Head Position Control

The pressure head 58 is movable with respect to the edge 66 of the knife 28 in order to limit movement of the block 26. The pressure head also guides the veneer as it is initially separated from the block 26, in order to prevent excessive splitting which would make the veneer unusable. The pressure head 58 includes a nose portion such as the roller bar 158 which actually contacts the block 26 and the veneer being cut. Preferably such a roller bar 158 is driven, as by the drive motor 159, to rotate with a surface speed of the roller bar equal to the surface speed of the block 26.

When cutting away naturally occurring irregularities of its shape from the outer surfaces of a block 26, wood can more speedily be removed in spiral layers which are thicker than the veneer which it is desired to produce eventually. This economizes veneer production by saving time and knife wear. To provide clearance for making such deeper cuts into the block 26 the pressure head 58 must be retracted from its normal position, yet it must be returnable accurately to the desired position relative to the edge 66.

The normal location of the pressure head 58 establishes an exit gap 160 (FIG. 7) between the surface of the roller bar 158 and the back surface 162 of the knife 28. Maintenance of the proper vertical gap 154 and horizontal gap 156, together defining the exit gap 160, during operation of a veneer lathe promotes uniformity of the veneer produced. The location of the roller bar 158 is adjustable in the lathe 20 in each of two directions relative to the location of the edge 66 of the knife 28, in order to separately adjust the vertical gap 154 and the horizontal gap 156.

Referring now to FIGS. 1–5, a pair of vertical gap adjustment wedges 164 are slidably supported on respective vertical gap adjustment slideways 166, one being located on each of the end portions 53 and 55 of the knife carrier 56. The vertical gap slideways 166 are inclined forward and upwardly with respect to the ways 30 and 32, and include both upper and lower slide surfaces to hold the wedges 164 in the slideways 166. Each end of the pressure head 58 is slidably supported atop the respective vertical gap adjustment wedge 164.

The slope of the slideway 166, relative to the ways 30 and 32, and the angular separation of the sides of the vertical gap adjustment wedge are preferably equal or only slightly different, so that movement of the vertical gap adjustment wedges 164 will not greatly alter the horizontal gap 156. It is possible to determine and compensate, however, for any such inequality.

At each end of the knife carrier 56 a separate vertical gap adjustment motor 168, preferably a stepping motor similar to the knife pitch control stepping motor 90, and controllable similarly for rotation in small angular increments, drives a respective vertical gap adjustment screw 170 which is threadedly engaged with the vertical gap adjustment wedge 164 to controllably move the vertical gap adjustment wedge 164 along the slideway 166. Preferably, the vertical gap adjustment screws 170 are of the ball screw type, with a corresponding ball nut being included in each vertical gap adjustment wedge 164.

A vertical gap adjustment sensor 172, similar to the pitch angle adjustment sensor 100, is provided for each vertical gap adjustment wedge 164. Each sensor 172 includes a vertical gap adjustment sensor waveguide tube 174 fixedly connected to the respective end portion 53 or 55 of the knife carrier 56. A vertical gap adjustment position indicating magnet 176 is fixedly attached to and movable along with each vertical gap adjustment wedge 164. The position of the sensing magnet 176 with respect to the sensor rod 174, as sensed by the sensor 172, thus provides a direct indication of the vertical gap 154 between the edge 66 and the roller nose 158 for each end of the pressure head 58. This indication may be provided in the form of an electrical signal to the computer 60 as will be appreciated.

The pressure head 58 is slidably movable atop the vertical gap adjustment wedges 164 to permit retraction and to vary the horizontal gap 156. A pressure head slide bar 177 extends horizontally from each end of the pressure head 58, and is held down atop the respective vertical gap adjustment wedge 164 by a slide cap 178. Pressure biased bearings 179, which will be described in greater detail below, are also provided in the slide cap 178.

A bell crank 180 has a first end 182 which is connected to the pressure head 58 by a drag link 184 having a pair of opposite ends which are pivotably connected respectively to the first end 182 of the bell crank 180 and to the pressure head 58. An extensible and contractible hydraulic cylinder and piston assembly 190 is pivotably connected by its respective ends, between a second end 192 of the bell crank 180 and a support member 193 on the knife carrier 56. Contraction of the hydraulic piston and cylinder assembly 186 rotates the bell crank 180, along with a torque tube 194 connecting the bell crank 180 with a similar bell crank 180a on the opposite of the lathe 20. This rotation of the bell cranks 180 retracts the pressure head 58 rearwardly away from its normal position close to the veneer knife 28 to provide clearance between the pressure head 58 and the knife 28 for cutting away uneven outer portions of a block 26 during rounding-up, using a radial cutting depth deeper than the normal veneer thickness. An ear 198 of each of the bell cranks 180 bears against spacer pad 198 of a low friction synthetic material located on the top of the respective end portion 53 or 55 of the knife carrier 56 to establish a reference position for each of the bell cranks 180 when the hydraulic cylinder 190 is in its normal extended state. Such normal positions of the bell cranks 180 establish a normal operating position of the pressure head 58.

A pressure head position sensor 187, similar to the position sensors 63 and 65, is connected between the end portion 53, the knife carrier 56 and the pressure head 58. It includes a sensor waveguide tube 188 connected with the end portion 53 and a position indicating magnet 189 connected to the pressure head 58 for movement along the sensor tube 188 as the pressure head 58 is moved relative to the knife 28. The pressure head position sensor 187 provides position signals to the computer 60 for use in servo control of the hydraulic cylinder and piston assembly 190 to retract and re-extend the pressure head 58.

A shaft 202 extends within the torque tube 194 and is journaled for rotation with respect to the bell cranks 180 to adjust the horizontal gap 156. Eccentric portions 204 of the shaft 202 extend outwardly from each end of the shaft 202 and are journaled rotatably within the respective end portion 53 or 55 of the knife carrier 56. A horizontal gap adjustment lever 206 is fixedly attached to and extends upwardly away from the eccentric portion 204 alongside the right end portion 53 of the knife carrier 56. Mounted on trunnions atop the right end portion 53 of the knife carrier 56 is a horizontal gap adjustment motor 208, preferably a stepping motor similar to those used to adjust knife height and the vertical gap.

The motor 208 drives a horizontal gap adjustment screw 210 engaged by its threads with a pivotable nut portion of the outer end of the horizontal gap adjustment lever 206.

A horizontal gap adjustment sensor 212 is mounted adjacent to the horizontal gap adjustment motor 208 to measure movement of the horizontal gap adjustment lever 206 relative thereto. A horizontal gap adjustment sensor tube 214 of the sensor 212 extends parallel with the horizonal gap adjustment screw 210, while a horizontal gap adjustment position indicating magnet 216 is fixedly attached to the horizontal gap adjustment lever 206 for movement therewith along the sensor tube 214 in response to movement of the horizontal gap adjustment lever 206 by the horizontal gap adjustment screw 210.

As the shaft 202 is rotated by the horizontal gap adjustment lever 206, the eccentric end portions 204 move the bell cranks 180 and 180a toward or away from the knife 28. This displacement of the bell cranks 180, transmitted through the drag links 184, moves the pressure head 58 horizontally along the top of the vertical gap adjustment wedge 164, and thus opens or reduces the horizontal gap 156 according to the direction in which the shaft 202 is rotated by the horizontal gap adjustment lever 206.

Figure 10:
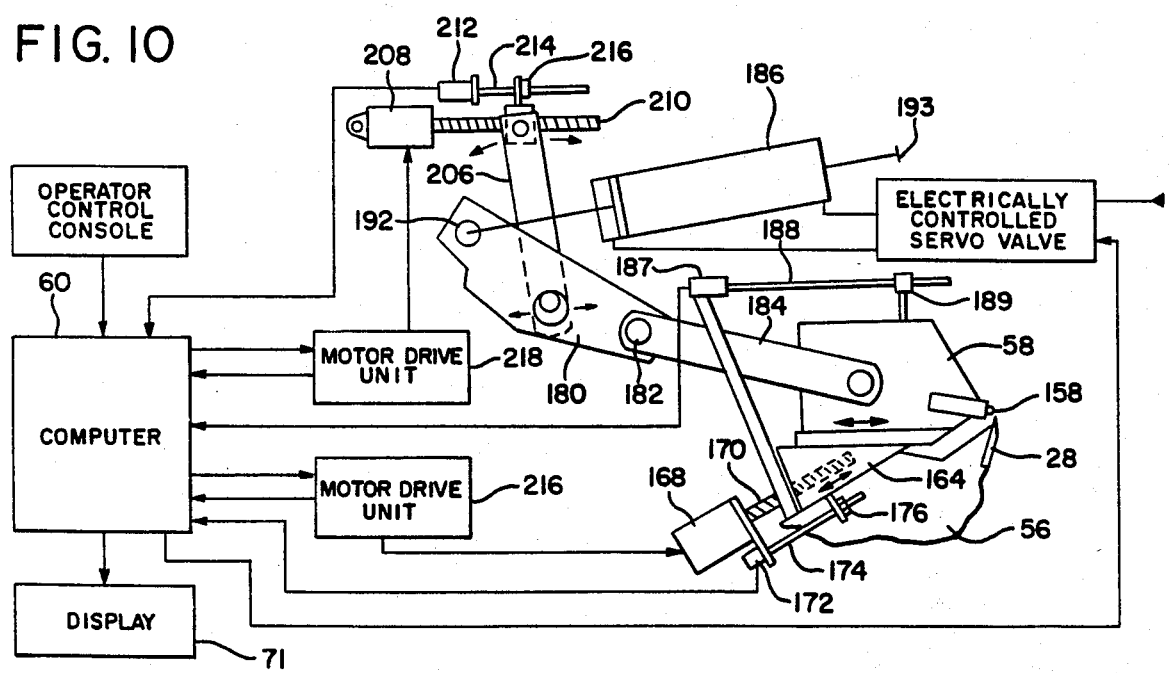
FIG. 10 is a simplified, partially schematic view showing the manner of adjusting the vertical gap and the horizontal gap between a pressure head and the veneer knife in a veneer lathe such as the one shown in FIG. 1.

Referring to FIG. 10, it may be seen that adjustment of both the vertical gap 154 and the horizontal gap 156 may be controlled with the use of a motor drive unit 216 and a motor drive unit 218, each being connected with the computer 60 in a manner similar to that discussed previously with respect to adjusting the pitch angle and knife height. In response to operator-initiated inputs, the computer 60 provides motor drive order signals to the motor drive units 216 and 218. The vertical gap adjustment motor drive unit 216 provides drive pulses to the vertical gap adjustment stepping motors 168 as required to move the vertical gap adjustment wedges 164 until the computer 60 determines from the position indication signals from the vertical gap adjustment sensors 172 that the vertical gap adjustment wedges 164 are in the proper new positions.

Similarly, the motor drive unit 218 provides drive pulses to the horizontal gap adjustment motor 208 in response to motor drive signals from the computer 60. The motor 208 rotates the horizontal gap adjustment screw 210, thereby moving the horizontal gap adjustment lever 206 and rotating the horizontal gap adjustment shaft 202, until the position signal provided by the horizontal gap adjustment sensor 212 to the computer 60 agrees with the horizontal gap adjustment position signal reference value determined by the computer 60. Preferably the computer 60 will be programmed to permit an operator to enter horizontal and vertical gap values directly and to display the measurements indicated by the position sensors 172 and 212 by means of the display unit 71.

Referring now also to FIG. 11, a pair of pneumatic cylinder and piston assemblies 224 are mounted pivotably on a reservoir 226, which extends transversely across the width of the veneer lathe 20 behind the cross-shaft 43. The piston shafts of the assemblies 224 are pivotably connected with the pressure head 58, to exert a continuous rearward pull on it, taking up any slack from the linkages controlling its movement. This provides better control of the horizontal gap and vertical gap and reduces undesired movement of the roller bar 158, and thus contributes to veneer uniformity.

Fluid Pressure-Biased Bearings

As previously mentioned in connection with the end members 34 and 35 of the main feed carriage, various locations components of the main feed carriage 33, knife carrier 56 and pressure head 58 are in frictional moving contact with one another. Although some wear is inevitable in these locations, and although motion of some components is necessary in certain directions in order to permit adjustment of knife height 141, knife pitch angle 75, vertical gap 154, and horizontal gap 156, it is desirable to reduce or eliminate most motion of these parts relative to one another in other directions, since any uncontrolled relative movement during lathe operation is likely to result in thickness variations in the veneer produced.

In order to eliminate or minimize vertical motion of the end members 34 and 35 of the main feed carriage 33 relative to the ways 30 and 32, fluid-pressure-biased bearings 140 are provided in a lower gib 228 of each of the end members 34 and 35 to firmly hold the end members 34 and 35 down on top of the ways 30 and 32. These bearings are of the type disclosed in Sohn U.S. Pat. No. 4,378,829, of which the disclosure is hereby incorporated herein by reference. Each of the fluid-pressure-biased bearings 140 includes a cylinder and piston assembly and a source of fluid pressure into the cylinder to urge the piston upwardly out of the cylinder, bringing the outer face of the piston to bear against a respective bottom surface 134 or 136 of each way 30 and 32, thus holding the slide pads 114 in close contact with the top surfaces of the ways 30 and 32.

A similar fluid-pressure-biased bearing 112 is located in each trunnion support 48 and 50 to exert pressure radially inward toward the respective trunnion 52 or 54, urging the trunnions downwardly and rearwardly with respect to the trunnion supports 48 and 50 and the end members 34 and 35 of the main feed carriage 33.

Additionally, similar fluid-pressure-biased bearings 179 are mounted in the slide cap 178 of each vertical gap adjustment wedge 164. The slide caps 178 extend over the slide bar 177 of each end portion 53 and 55 of the knife carrier 58. The fluid-pressure-biased bearings 179 press downwardly against the slide bar 177 of each end of the pressure head 58, holding it tightly down against the vertical gap adjustment wedge 164, to prevent vertical movement of the pressure head 58 and resultant variations in the vertical gap 154 and exit gap 160.

Finally, a similar fluid-pressure-biased bearing 116 is located in each of the downwardly depending portions 89 of the main feed carriage end members 34 and 35, above the reaction member 88. Each fluid-pressure-biased bearing 116 holds the respective reaction member 88 downward in the downwardly depending portions 89 to restrain the eccentric end portions 84 and 86 of the eccentric shaft 82 from moving upwardly as the knife pitch adjustment shaft 82 is rotated. This assures that the pitch angle lever arms 76 and 78 are in fact moved as desired, to vary the pitch angle 75 when the shaft 82 is rotated. The fluid-pressure-biased also prevent undesired variation of the pitch angle 75 if the blade 28 should encounter knots, otherwise uneven wood density, or other variations in the block 26 which might tend to move the knife 28 if there were any freedom for the pitch angle lever arms 76 and 78 to move upward.

Figure 12:
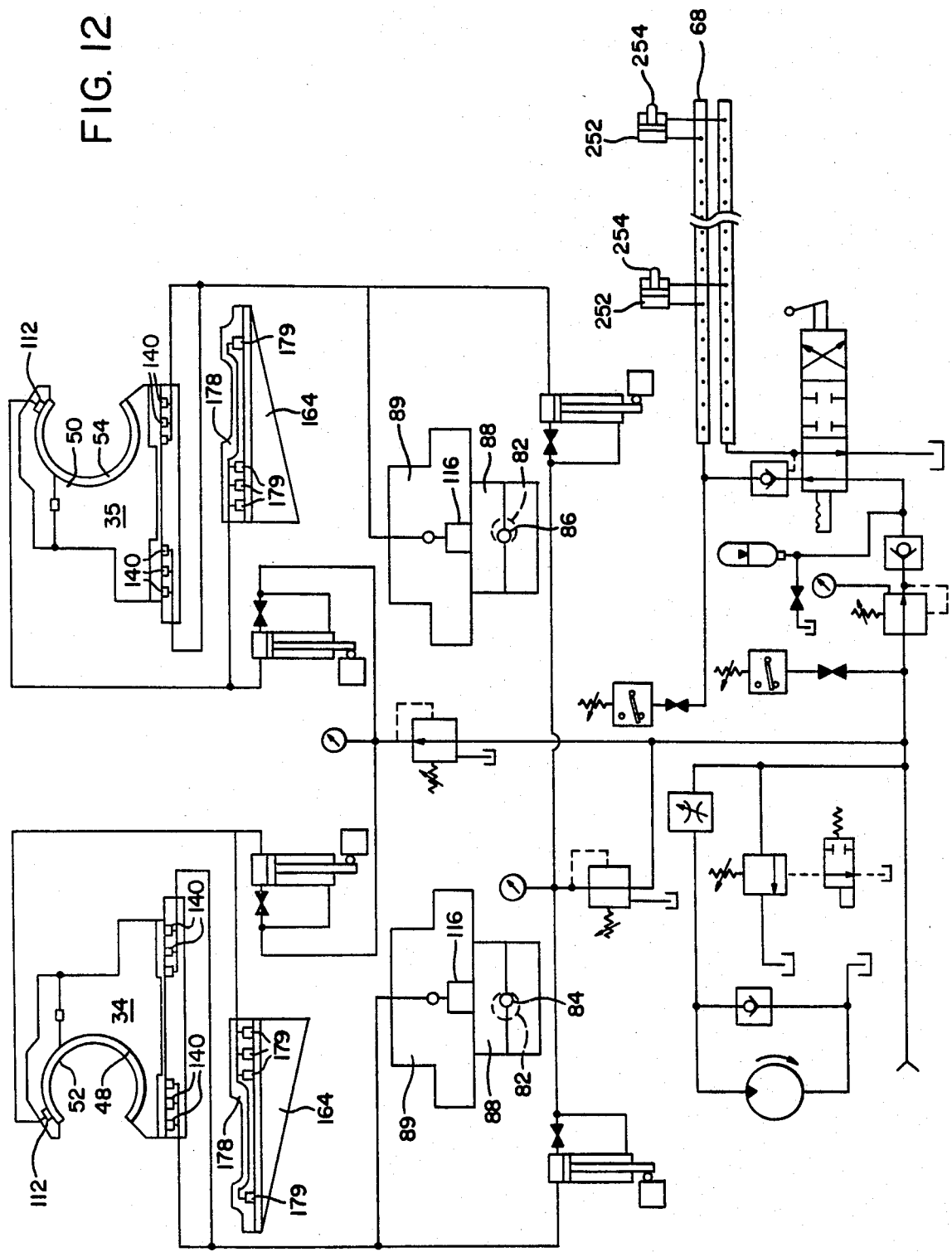
FIG. 12 is a schematic view of the fluid pressure system associated with certain bearings of the veneer lathe in FIG. 1.

The fluid-pressure-biased bearings 140, 112, 179, and 116 are connected to a source of controlled pressure fluid as shown in FIG. 12, and provision is made for sensing fluid leakage and providing an indication of such leakage to the operator of the lathe early enough to prevent damage to the lathe.

Knife Clamp Apparatus

Figure 3:
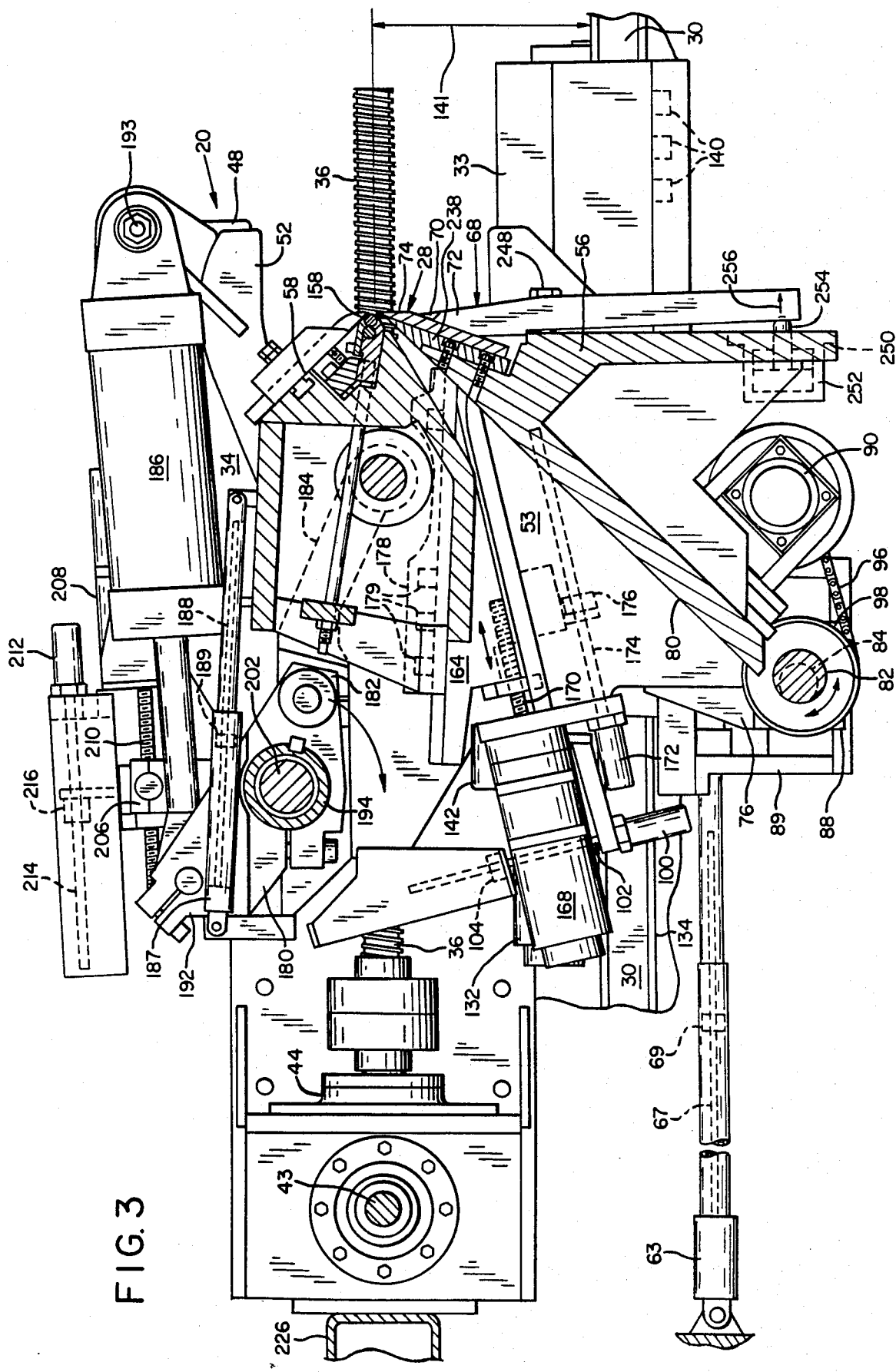
FIG. 3 is a sectional view, taken along line 3—3, of the veneer lathe shown in FIG. 1.
Figure 4:
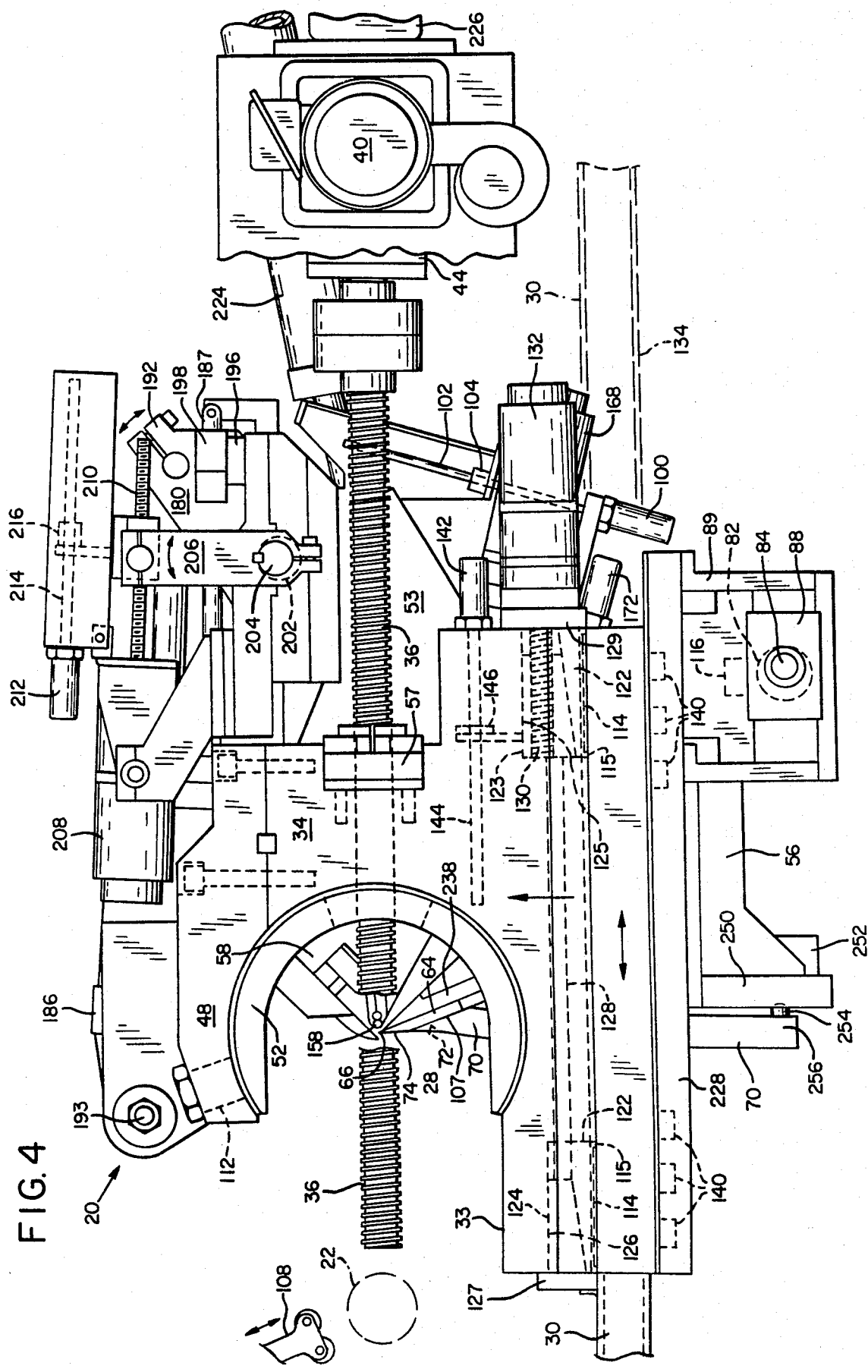
FIG. 4 is a right-side elevational view of the veneer lathe shown in FIG. 1.
Figure 5:
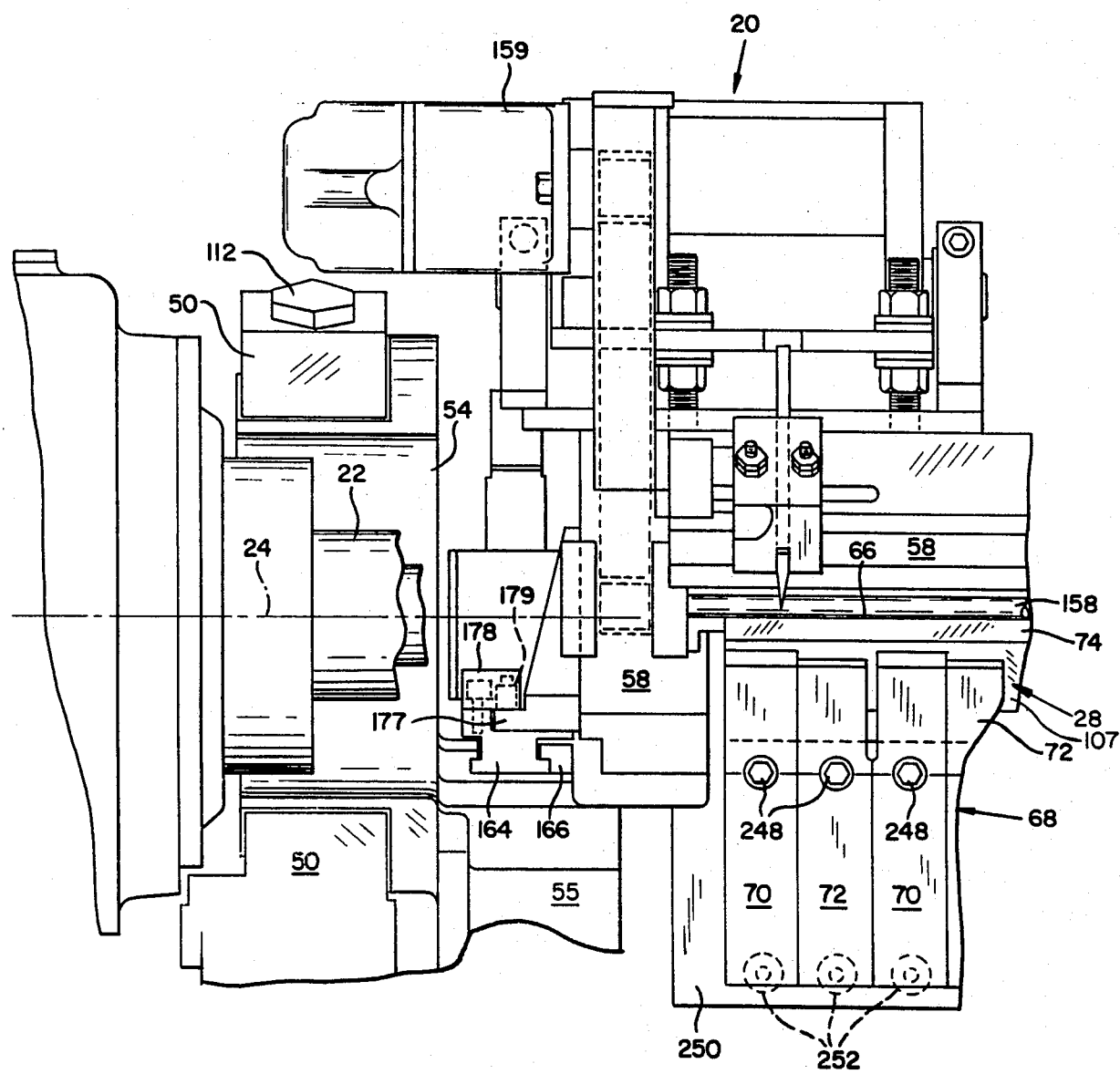
FIG. 5 is a front elevational view of the veneer lathe shown in FIG. 1.

The knife clamp apparatus 68, including clamp segments 70 and 72, is shown partially in FIGS. 3 and 4 in side view and may be seen in front view in FIGS. 5 and 13. Referring now also to FIGS. 14 and 15 it may be seen that each of the clamp segments 70 includes a clamping face 240 which extends further in the direction of the length of the clamp segments 70 than does the corresponding clamping face 242 of the clamp segments 72. Each of the clamp segments 70 and 72 includes a pivot bolt hole 244 or 246 and a respective pivot bolt 248 attaches each clamp segment 70 or 72 pivotably, using a hemispherical washer and seat combination 249, to a front portion 250 of the knife carrier 56, with the respective clamping faces 240 and 242 facing toward the knife 28.

A plurality of fluid pressure operated clamping cylinder and piston assemblies 252 extend rearwardly through the downwardly extending front portion 250 of the knife carrier 56. A piston rod of each cylinder and piston assembly 252 includes a rounded end 254 which extends forwardly from the front portion 250 of the knife carrier, and each clamping segment 70 and 72 includes a shallow spherical socket to receive the rounded end 254 of the respective piston rod.

When pressure is exerted in the cylinder and piston assemblies 250, forcing the piston rods outwardly, in the direction of the arrow 256, against the clamp segments 70 and 72, each of the segments 70 and 72 pivots about the fulcrum provided by the pivot bolt 248 and the associated hemispherical washer and seat combination 249, and exerts pressure with its clamping face 240 or 242 against the knife 28. The bolts 248 are individually adjusted to bring the clamping faces 240 and 242 to bear flat against the knife 28.

The clamping face 240 of each of the clamp segments 70 is about one inch longer than the clamping face 242 of the clamp segments 72. The clamping faces 240, then, exert pressure against an area extending to a toe portion of the knife 28, that is, the portion of the knife which is adjacent to the ground surface 74. The clamping faces 242 of the shorter clamp segments 72 exert pressure, over a smaller area, centered nearer the heel portion 107 of the knife 28, farther away from the edge 66 and the ground surface 74, so that the knife 28 is pressed against the backing plate 238 with clamping pressure concentrated along two lines, both parallel with the edge 66, but separated from one another by, for example, about 1 inch. These parallel lines of pressure concentration hold the knife 28 firmly against the backing plate 238, preventing the common tendency of the knife to rock as was possible in knife clamps pressing against a knife along a single line parallel with the edge.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A veneer lathe, comprising:

(a) spindle means, defining a spindle axis, for rotating a block about said spindle axis while veneer is cut from said block;

(b) way means, located fixedly and extending generally transversely with respect to said spindle axis, for supporting a main feed carriage;

(c) a main feed carriage movably supported on said way means for movement therealong transversely toward and away from said spindle axis;

(d) main feed carriage position sensor means for sensing the position of said main feed carriage on said way means with respect to said spindle axis;

(e) main feed carriage position indicator means remote from said main feed carriage position sensor means and responsive thereto for indicating the position of said main feed carriage;

(f) spindle rotation measuring means for determining the amount of rotation of said spindle means and providing an indication thereof at a location remote from said spindle means;

(g) motor means for moving said main feed carriage along said way means tranversely toward and away from said spindle axis; and (h) automatic means responsive to said indications of the position of said main feed carriage and the amount of rotation of said spindle means, for controlling said motor means in response to said indication of the position of said main feed carriage to move said main feed carriage on said way means by an amount having a predetermined relationship to the amount of rotation of said spindle means.

2. A veneer lathe, comprising: (a) spindle means, defining a spindle axis, for rotating a block about said spindle axis while veneer is cut from said block;

(b) way means, located fixedly and extending generally transversely with respect to said spindle axis, for supporting a main feed carriage;

(c) a main feed carriage movably supported on said way means for movement therealong transversely toward and away from said spindle axis, said main feed carriage including a pair of end members, each end member being independently supported on said way means;

(d) main feed carriage position sensor means associated with each said end member for sensing the position of each said end member with respect to said way means;

(e) comparator means for comparing the respective positions of said end members;

(f) motor means for moving said main feed carriage along said way means transversely toward and away from said spindle axis; and (g) automatic means for stopping said motor means in response to sensing a difference greater than a predetermined maximum between the respective positions of said end members, with respect to said way means.

3. A method of controlling the movement of a main feed carriage of a veneer lathe, comprising:

(a) measuring the amount of rotation of a set of spindles which rotate a block from which veneer is being peeled;

(b) providing a main feed drive speed control signal to a main feed carriage drive motor during cutting of veneer to move the main feed carriage toward the spindles at a speed bearing a predetermined relationship to the speed of rotation of the spindles;

(c) repeatedly measuring the amount of rotation of the spindles and the position of the main feed carriage relative to the spindles while moving the main feed carriage during peeling of veneer from said block;

(d) determining the amount of main feed carriage movement from measurements of carriage position; and (e) automatically altering the value of the main feed drive speed control signal in response to measuring the position of the main feed carriage and the amount of rotation of the spindles, so as to provide a predetermined amount of movement of the main feed carriage in response to measuring the amount of rotation of the spindles of the lathe.

4. The method of claim 3 including the step of measuring the position of the main feed carriage and the amount of rotation of the spindles with reference to the respective positions of said main feed carriage and spindles at the time of beginning to peel veneer from a block.

* * * * *